(12) United States Patent
Shimazu et al.

(10) Patent No.: US 9,500,114 B2
(45) Date of Patent: Nov. 22, 2016

(54) WORK VEHICLE DISPLAY DEVICE AND WORK VEHICLE

(71) Applicant: Komatsu Ltd., Tokyo (JP)

(72) Inventors: Mitsuhiro Shimazu, Fujisawa (JP); Hayato Matsumoto, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 21 days.

(21) Appl. No.: 14/372,090

(22) PCT Filed: Feb. 18, 2014

(86) PCT No.: PCT/JP2014/053785
§ 371 (c)(1),
(2) Date: Jul. 14, 2014

(87) PCT Pub. No.: WO2015/025535
PCT Pub. Date: Feb. 26, 2015

(65) Prior Publication Data
US 2015/0233278 A1    Aug. 20, 2015

(51) Int. Cl.
*B60Q 1/00*    (2006.01)
*F01N 11/00*   (2006.01)
*F01N 3/18*    (2006.01)

(52) U.S. Cl.
CPC .............. *F01N 11/00* (2013.01); *F01N 3/18* (2013.01)

(58) Field of Classification Search
None
See application file for complete search history.

(56) References Cited

U.S. PATENT DOCUMENTS 5,995,886 A * 11/1999 Tanaka ............... B60K 15/077
                                                340/457.4
8,473,178 B2   6/2013 Oe
(Continued)

FOREIGN PATENT DOCUMENTS

DE  10 2007 032 257 A1   1/2009
JP       2005248646 A    9/2005
(Continued)

OTHER PUBLICATIONS

International Search Report and Written Opinion dated Apr. 28, 2014, issued for PCT/JP2014/053785.

*Primary Examiner* — Julie Lieu
(74) *Attorney, Agent, or Firm* — Locke Lord LLP

(57) ABSTRACT

A work vehicle display device included in a work vehicle including an internal-combustion engine that generates power and an exhaust gas processing device that processes exhaust gas discharged from the internal-combustion engine using urea water, the work vehicle display device includes: a display unit configured to display an image; and a display control unit configured to display either a first image or a second image different from the first image in the display unit, wherein the display control unit displays device information having a same content related to a state of the exhaust gas processing device in the first image and the second image.

16 Claims, 3 Drawing Sheets

(56) References Cited

U.S. PATENT DOCUMENTS

| | | | |
|---|---|---|---|
| 2003/0033799 A1* | 2/2003 | Scheying | B01D 53/9431 60/286 |
| 2010/0218484 A1* | 9/2010 | Arlt | F01N 3/208 60/274 |
| 2010/0280740 A1* | 11/2010 | Oe | B60K 6/445 701/102 |
| 2012/0010786 A1 | 1/2012 | Stickel et al. | |
| 2013/0160433 A1* | 6/2013 | Schepers | G01F 23/00 60/295 |
| 2013/0176120 A1* | 7/2013 | Shibamori | E02F 9/267 340/438 |
| 2013/0255235 A1* | 10/2013 | Hodgson | F01N 3/0871 60/287 |
| 2013/0263591 A1* | 10/2013 | Anilovich | F01N 11/00 60/605.1 |
| 2013/0318950 A1* | 12/2013 | Gottwald | F01N 3/2066 60/295 |
| 2014/0019025 A1* | 1/2014 | Shinomiya | F02D 41/029 701/101 |
| 2015/0019054 A1* | 1/2015 | Sangameswaran | B60K 35/00 701/22 |
| 2015/0096285 A1* | 4/2015 | Andrews | F01N 11/00 60/286 |
| 2015/0192048 A1* | 7/2015 | Tanioka | F01N 3/106 422/119 |
| 2015/0310678 A1* | 10/2015 | Ito | B60Q 9/00 701/32.3 |

FOREIGN PATENT DOCUMENTS

| | | |
|---|---|---|
| JP | 2009-127521 A | 6/2009 |
| JP | 2010-261373 A | 11/2010 |
| JP | 2012-072617 A | 4/2012 |
| JP | 2015-021258 A | 2/2015 |
| KR | 10-2013-0058995 A | 6/2013 |
| WO | WO-2009/110269 A1 | 9/2009 |

* cited by examiner

WORK VEHICLE DISPLAY DEVICE AND WORK VEHICLE

FIELD

The present invention relates to a work vehicle display device that is included in a work vehicle and is displaying various types of information, and a work vehicle including the work vehicle display device.

BACKGROUND

Some work vehicles such as excavators or dump trucks include an internal-combustion engine, such as a diesel engine, as a power generation source. From the viewpoint of a decrease in an environmental load, it is required to discharge exhaust as discharged from the internal-combustion engine after purification. Therefore, there are some work vehicles including a device purifies the exhaust gas (for example, Patent Literature 1).

CITATION LIST

Patent Literature

Patent Literature 1: Japanese Patent Application Laid-open No. 2009-127521

SUMMARY

Technical Problem

Some of the work vehicles including a device that performs purification processing of the exhaust gas include a display device that displays a state of the device that performs the purification processing of the exhaust gas (hereinafter, appropriately referred to as "exhaust gas processing device"). Even if such a display device is included, if an operator does not pay attention to information displayed on the display device, or the information displayed in the display device is not sufficient, processing of abnormality of the work vehicle may be delayed or an opportunity to maintain and inspect the work vehicle may be missed.

An objective of the present invention is in a work vehicle including an internal-combustion engine and an exhaust gas processing device that processes exhaust gas discharged from the internal-combustion engine, to easily invite an operator of the work vehicle to pay attention to a state of the exhaust gas processing device.

Solution to Problem

According to the present invention, a work vehicle display device included. in a work vehicle including an internal-combustion engine that generates power and an exhaust gas processing device that processes exhaust gas discharged from the internal-combustion engine using urea water, the work vehicle display device comprises: a display unit configured to display an image; and a display control unit configured to display either a first image or a second image different from the first image in the display unit, wherein, the display control unit displays device information having a same content related to a state of the exhaust gas processing device in the first image and the second image.

In the present invention, it is preferable that the display control unit displays the device information in the first image and the second image in similar display forms.

In the present invention, it is preferable that the device information is a residual amount of urea water accumulated in a tank included in the work vehicle and is supplied to the exhaust gas processing device.

In the present invention, it is preferable that the display control unit displays the device information differently from a normal case when abnormality has occurred in detection of the residual amount of the urea water.

In the present invention, it is preferable that the display control unit displays the first image during work of the work vehicle, and enables the second image to be displayed while the work vehicle is not working, In the present invention, it is preferable that the first image is a normal image displayed during an operation of the work vehicle, and the second image is an image switched. from the normal image to be displayed in response to an input from an input device or an event, that has occurred in the work vehicle.

According to the present invention, a work vehicle display device included in a work vehicle including an internal-combustion engine that generates power and an exhaust gas processing device that processes exhaust gas discharged from the internal-combustion engine, the display device comprises: a display unit configured to display an image; and a display control unit configured to display either a first image or a second image different from the first image in the display unit, wherein the display control unit. displays device information having a same content related to a residual amount of urea water supplied to the exhaust gas processing device in the first image and the second image in similar display forms.

According to the present invention, a work vehicle comprises an internal-combustion engine configured to generate power; an exhaust gas processing device configured to process exhaust gas discharged from the internal-combustion engine using urea water; and the work vehicle display device.

The present invention cart easily invite the operator of a work vehicle to pay attention to a state of an exhaust gas processing device, in the work vehicle including an internal-combustion engine and the exhaust gas processing device that processes exhaust gas discharged from the internal-combustion engine.

DESCRIPTION OF EMBODIMENTS

An embodiment for implementing the present invention (embodiment) will be described in detail with reference to the drawings.

<Work Vehicle 10>

Figure 1:
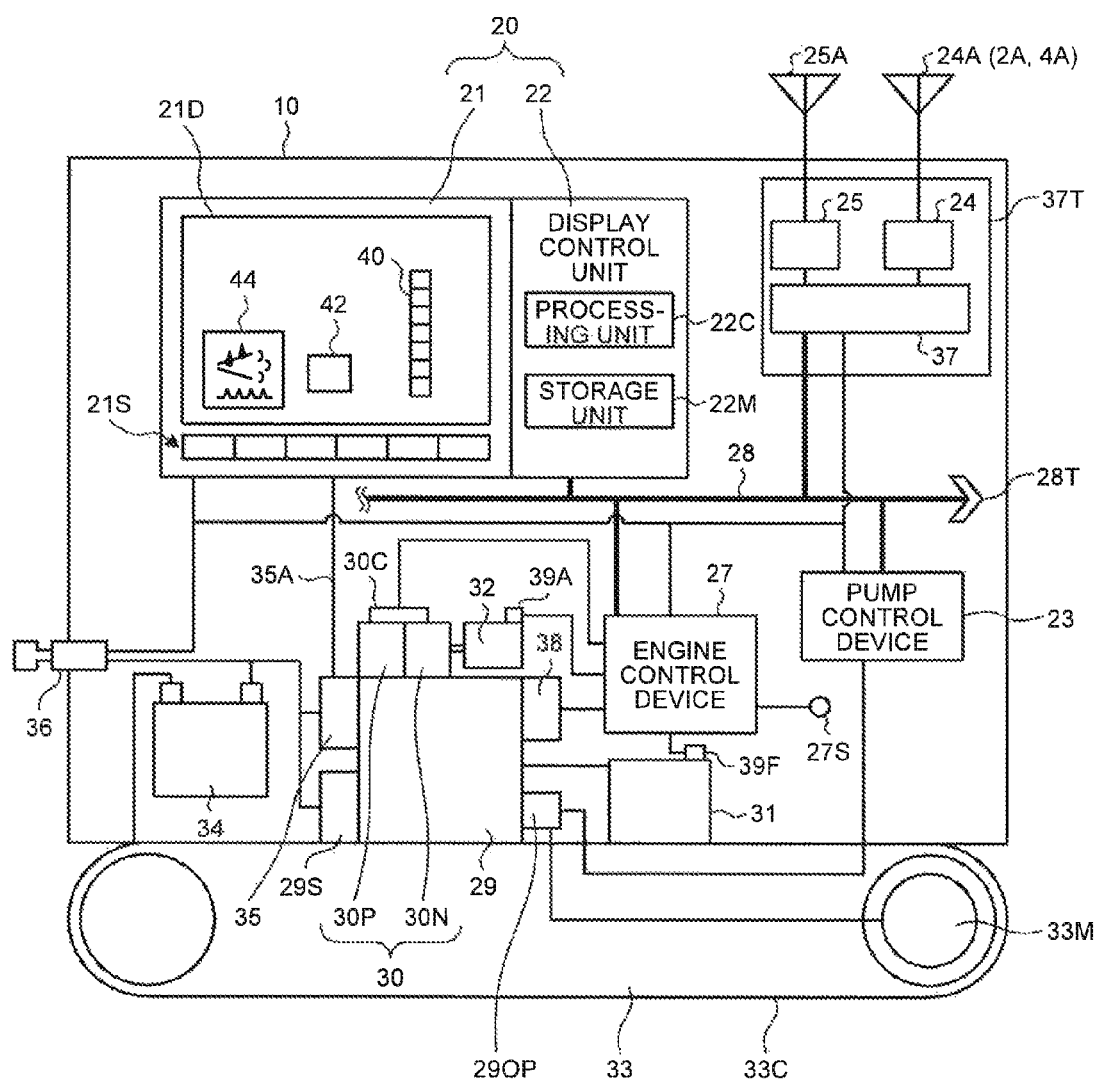
FIG. 1 is a diagram illustrating an example of a work vehicle according to an embodiment of the present invention.
Figure 2:
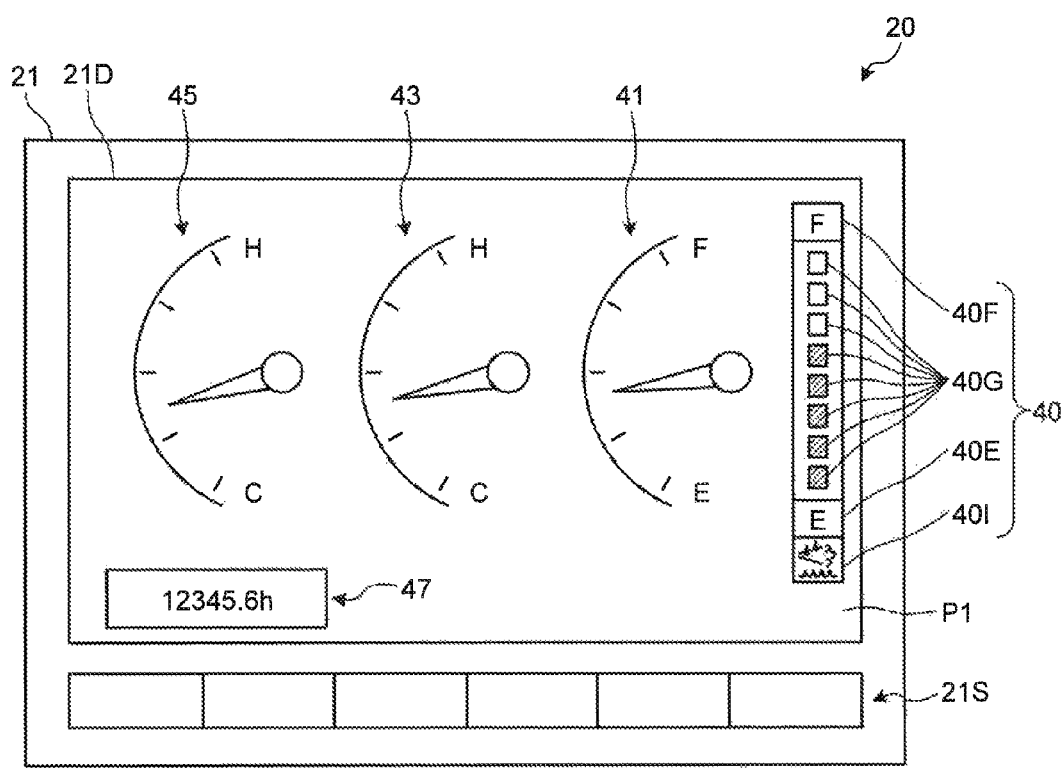
FIG. 2 is an example of a diagram illustrating a state in which a monitor displays a first image.
Figure 3:
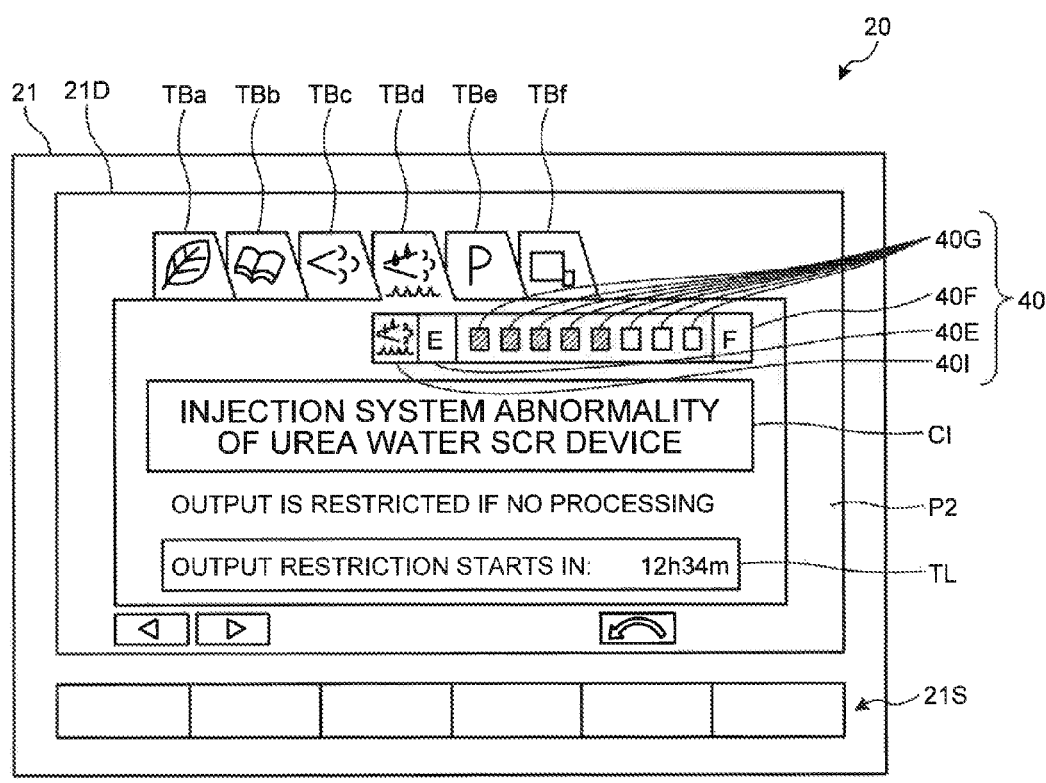
FIG. 3 is an example of a diagram illustrating a state in which the monitor displays a second image.

FIG. 1 is a diagram illustrating an example of a work vehicle 10 according to an embodiment of the present invention. FIG. 2 is an example of a diagram illustrating a state in which a monitor 20 displays a first image P1. FIG. 3 is an example of a diagram illustrating a state in which the monitor 20 displays a second image 92. The work vehicle 10 is, for example, but not limited to, an excavator, a dump truck, a wheel loader, a bulldozer, a forklift, or the like. The work vehicle 10 includes the monitor 20 as a work vehicle display device, an engine 29 as an internal-combustion engine, and an exhaust gas processing device 30 that processes exhaust gas discharged from the engine 29. Other than the above, the work vehicle an 10 includes a pump control device 23, a communication device 24, a position detection device 25, an engine control device 27, an in-vehicle signal line 28, a fuel tank 31, a urea water tank 32, a traveling device 33, a storage battery 34, an alternator 35, a key switch 36, a rotation speed detection sensor 38, and a liquid surface detection sensors 39A and 39F as a detector that detects an amount of a liquid. As the detector that detects the amount of a liquid, an ultrasonic sensor can be used, which is capable of acquiring a height of a liquid surface by detecting a float floating on the liquid, for example. Further, the amount of a liquid may be detected using another detector, such as a liquid amount sensor which directly measures the amount of a liquid, instead of detecting the liquid surface.

The monitor 20 is a device that displays an image. The monitor 20 includes a display unit 21 and a display control unit 22. The monitor 20 is installed inside a driver's cab (not illustrated) of the work vehicle 10. In the present embodiment, the monitor 20 displays various types of information of the work vehicle 10 in the display unit 21 as an image. In the example of FIG. 1, a urea water gauge 40, an warning icon 42, an abnormal portion displaying icon 44, and the like are displayed on a screen 21D of the display unit 21.

All of the urea water gauge 40, the warning icon. 42, and the abnormal portion displaying icon 44 are information related to the work vehicle 10. The urea water gauge 40 displays a residual amount of urea. water accumulated in the urea water tank 32. The warning icon 42 indicates abnormality has occurred in the exhaust gas processing device 30. The abnormal portion displaying icon 44 indicates a portion. where abnormality has occurred. The monitor 20 displays information related to the work vehicle 10, other than the above information. Further, when the work vehicle 10 includes a surroundings monitoring camera or a back monitor camera, the monitor 20 displays an image captured by the camera on the screen 21D.

In the present embodiment, the monitor 20 also functions as an input device, in addition to displaying various images on the screen 21D of the display unit 21. Therefore, the monitor 20 includes an input device 21S below the screen 21D of the display unit 21. The location of the input device 21O is not limited to the location below the display unit 21. The input device 21S may be provided in another location, or may be a separate body from the display unit 21. When the input device 21S is a separate body from the display unit 21, the input device 21S may be provided in a console inside the driver's cab (not illustrated). In the present embodiment, the input device 21S includes a plurality of push button switches arranged below the screen 21D in a lateral direction. By an operation of the input device 21S, the image displayed on the screen 21D of the monitor 20 can be switched, the processing can be executed by the work vehicle 10, or various types of setting related to an operation of the work vehicle 10 can be executed. Examples of the processing executed by the work vehicle 10 include regeneration processing of a diesel particulate filter (DPF) device 30P of the exhaust gas processing device 30, output restriction release processing of the engine 29, and the like. The output restriction release processing is processing to temporarily release restriction of an output in a state where the output of the engine 29 is restricted, when soot of a predetermined level is accumulated in a filter of the DPF device 30P or when the urea water is decreased to a predetermined level. The processing executed by the work vehicle 10 is not limited to the above processing. The work vehicle 10 may restrict not only the output of the engine 29, but also an injection amount of working oil of a hydraulic pump 29OP and an output of the hydraulic pump 29OP, when soot of a predetermined. level is accumulated in a filter of the DPF device 30P, or when the urea water is decreased to a predetermined level. Further, when the work vehicle 10 is an excavator that causes an upper swing body to swing by an electric motor, or a dump truck that drives wheels by an electric motor, the work vehicle 10 may execute restriction. of an output of the electric motor when it becomes in a state where an output needs to be restricted, as described above.

The display unit 21 of the monitor 20 is, for example, but not limited to, a liquid crystal display device. In the present embodiment, the monitor 20 also functions as an input device, and thus the display unit 21 may include a touch panel on the screen 21D so as to allow the monitor 20 to exert the function as an input device.

The display control unit 22 controls an operation of the display unit 21, performs image processing, and processes an input, from the input device 21S. The display control unit 22 includes, for example, a processing unit 220 and a storage unit 22M. The processing unit 22C is, for example, a combination of a central processing unit (CPU) and a memory. The storage unit 22M is, for example, a random access memory (RAM), a read only memory (ROM), a flash memory, a hard disc drive, or a combination thereof. The storage unit 22M stores computer programs necessary for execution of the various types of processing by the display control unit 22, data, various types of setting data related to the operation of the work vehicle 10, and the like.

The processing unit 22O realizes various types of processing executed by the display control unit 22 by reading the computer programs from the storage unit 22M, and executing commands described in the computer programs.

In the present embodiment, the display control unit 22 displays, in the display unit 21, either a first image P1 illustrated in FIG. 2 or a second image P2 illustrated in FIG. 3, which is different from the first image P1. Further, the display control unit 22 displays device information as information related to a state of the exhaust gas processing device 30 illustrated in FIG. 1 in the first image P1 and the second image P2. In this case, the device information indicating the same content is displayed in the first image P1 and the second image P2 in similar display forms. In the present embodiment, the device information is a urea water gauge 40 that indicates a residual amount of the urea water accumulates in the urea water tank 32 illustrated in FIG. 1. The urea water gauge 40 is displayed in each of the first image P1 and the second image P2 displayed on the screen 21D of the display unit 21 at different timings.

The urea water is sometimes poor in distributability, and cannot be easily obtained in some countries or regions. Therefore, the operator needs to monitor the residual amount of the urea water consumed along with the operation of the work vehicle 10 on a steady basis. The display control unit 22 displays the urea water gauge 40 in both of the first image P1 and the second image P2, so that the operator of the work vehicle 10 can be invited to pay attention to the residual amount of the urea water. Therefore, the operator can easily recognize the residual amount of the urea water. Further, the urea water gauge 40 displayed in both of the first image P1 and the second image P2 is displayed in similar display forms. Therefore, the operator who is used to seeing the urea water gauge 40 displayed in the first image P1 can intuitively understand that the urea water gauge 40 displayed in the second image P2 indicates the residual amount of the urea water, even if the screen 21D is switched to the second image P2.

In the present embodiment, the monitor 20 is electrically connected to the in-vehicle signal line 28. The monitor 20 communicates with the pump control device 23, the engine control device 27, and the like using a communication protocol applied to the in-vehicle signal line 28, such as controller area network (CAN).

The pump control device 23 is a device that controls an angle of a swash plate of the hydraulic pump 29OP, and adjusts an injection. amount of working oil given. to hydraulic equipment, such as a hydraulic cylinder. The pump control device 23 is electrically connected to the in vehicle signal line 28, and can communicate with the monitor 20 and the engine control device 27 that are similarly electrically connected to the in-vehicle signal line 28.

The communication device 24 includes an antenna 24. A The communication device 24, the position detection device 25, and an information collection device 37 are incorporated into a communication processing device 37T. The communication processing device 37T is electrically connected to the in-vehicle signal line 28. The communication device 24 can communicate with an outside of the work vehicle 10. In the present embodiment, the communication device 24 is a communication modem, for example. The communication device 24 includes various control devices, various sensors, a communication terminal, and a communication modem. The communication device 24 performs wireless communication through the antenna 24A. The information collection device 37 connected to the communication device 24 collects operation information of the work vehicle 10 from the sensors, the engine control device 27, the pump control device 23, and the like included in the work vehicle 10, and transmits the operation information to an outside through the communication device 24 and the antenna 24A. The operation information includes information related to the residual amount of the urea water obtained from the liquid surface detection sensors 39A and 39F, and the like, for example. Further, the communication device 24 receives information transmitted from an external control device to the work vehicle 10.

The position detection device 25 includes a GPS antenna 25A. The GPS antenna 25A. receives radio waves output from a plurality of GPS satellites that configures a global positioning system (GPS). The GPS antenna 25A outputs the received radio waves to the position detection device 25. The position detection device 25 converts the radio waves received by the GPS antenna 25A into electrical signals, and obtains position information of the work vehicle 10 on which the position detection device 25 is mounted by calculating (measuring) own position information, that is, the position of the position detection device 25. The position information is information related to the position of the work vehicle 10, and latitude, longitude, or coordinates of an altitude. The position detection device 25 may use not only the GPS satellite but also another positioning satellite to measure the own position. That is, another positioning satellite can be employed as long as position measurement by a global navigation satellite system (GNSS) can be performed. The position information of the work vehicle 10 obtained by the position detection device 25 is transmitted to an outside of the work. vehicle 10 by the communication device 24 together with the operation information of the work vehicle 10.

The communication device 24 and the position detection device 25 are electrically connected to the information collection device 37. The information collection device 37 is electrically connected to the in-vehicle signal line 28. The information collection device 37 generates information related to abnormality having occurred in the work vehicle 10 (hereinafter, appropriately referred to as the "abnormal information"), and collects the operation information. The information collection device 37 transmits the generated abnormal information to an outside of the work vehicle 10 through the communication device 24 and the antenna 24A.

The operation information includes information obtained from various sensors, such as a pressure sensor (not illustrated), the rotation speed sensor 38, a temperature sensor, or the liquid surface detection sensors 39A and 39F. For example, an example of the information obtained from the pressure sensor includes an oil pressure of engine oil. Further, an example of the information obtained from the rotation speed sensor 38 is a rotation speed (an engine speed per unit time) of the engine 29, and an example of the information obtained from the temperature sensor includes a temperature of cooling water of the engine 29. The position information (the latitude, the longitude, or the altitude) of the work vehicle 10 detected by the position detection device 25 and the information related to the abnormality that has occurred in the work vehicle 10 are also transmitted to the outside of the work vehicle 10 by the communication device 24. The information related to abnormality that has occurred in the work vehicle 10 is also included in the operation information. The information related to abnormality that has occurred in the work vehicle 10 is, for example, some sort of an error code, a type of the abnormality, or an occurrence time of the abnormality. The operation information is not limited to the information related to the abnormality that has occurred in the work vehicle 10, and may include information that indicates that the work vehicle 10 is being normally operated, such as an operation time The engine control device 27 controls the engine 29 and the exhaust gas processing device 30, The engine control device 27 is electrically connected to the in vehicle signal line 28. In the present embodiment, the engine 29 controlled by the engine control device 27 is a diesel engine. The engine 29 is not limited to a diesel engine, and may be any other engine as far as it is an internal-combustion engine. The engine 29 drives the hydraulic pump 29OP to supply the working oil to the hydraulic equipment included in the work vehicle 10, The exhaust gas processing device 30 purifies the exhaust gas discharged from the engine 29 using the DPF device 30P and a urea selective catalytic reduction (SCR) device 30N using urea SCR. The urea water supplied to the urea SCR device 30N is accumulated in the urea water tank 32, Note that, in the present embodiment, a case in which the exhaust gas processing system (the urea SCR device 30N and the urea water tank 32) using the urea water is included in the work vehicle 10 has been described. However, it is not intended to exclude the work vehicle 10 that does not include such an exhaust gas processing system. Further, the configuration and the type of the exhaust gas processing device 30 differ depending on the type of the engine 29. Next, an example of control of the engine control device 27 will be described.

The engine control device 27 controls the amount of fuel supplied to the engine 29 based on the rotation speed of a crank shaft of the engine 29 detected by the rotation speed detection sensor 38, setting of a fuel adjustment dial 27S, and the like. In this way, the engine control device 27 controls the engine 29. The engine control device 27 controls the amount of the urea. water supplied to the urea SCR device 30N of the exhaust gas processing device 30 used on the amount of nitrogen oxide contained in the exhaust gas discharged from the engine 29, and the like.

The exhaust gas processing device 30 includes various sensors 300. The various sensors 30C includes, for example, a sensor that detects the amount of nitrogen oxide contained in the exhaust gas, a temperature sensor that detects the temperature of the exhaust gas, and a sensor that detects ammonia in the urea SCR device 30N. When the amount of a nitrogen oxide contained in the exhaust gas detected by the various sensor 30C exceeds a predetermined amount, the engine control device 27 supplies the urea water from the urea water tank 32 to an injection device (not illustrated). The injection device is included in the configuration of the urea SCR device 30N. Then, the urea SCR device 30N injects the urea water into the exhaust gas through the injection device, The nitrogen oxide contained in the exhaust gas is reduced (decomposed) into nitrogen and water by the urea water.

The engine control device 27 obtains the residual amount of the urea water in the urea water tank 32 based on a detection value of the liquid surface detection sensor 39A that detects the amount of the urea water accumulated in the urea water tank 32. The engine control device 27 transmits the obtained residual amount of the urea water to the monitor 20. The monitor 20 displays the residual amount of the urea water in the urea water gauge 40 illustrated in FIG. 1, for example. Further, the engine control device 27 obtains a residual amount of fuel in the fuel tank 31 based on a detection value of the liquid surface detection sensor 39F that detects the amount of the fuel accumulated in the fuel tank 31. The engine control device 27 transmits the obtained residual amount of the fuel to the monitor 20, and displays the residual amount of the fuel in the fuel gauge 41 displayed on the screen 21D of the monitor 20, for example. The detection value of the liquid surface detection sensor 39F that detects the amount of fuel may be directly transmitted to the monitor 20, so that the residual amount of the fuel in the fuel tank 31 is obtained by the processing unit 220 of the monitor 20, for example. Further, the detection value of the liquid surface detection sensor 39A that detects the amount of the urea water may be directly transmitted to the monitor 20, so that the residual amount of the urea water in the urea water tank 32 is obtained by the display control unit 22 of the monitor 20, for example.

The engine control device 27 transmits a "signal which indicates that the engine 29 is during operation" to the monitor 20 through the in-vehicle signal line 28, and the monitor 20 counts a time during which the monitor 20 is receiving the signal, and obtains an accumulated operation time. Note that the engine control, device 27 receives a signal from the rotation speed sensor 38 that detects the rotation speed of the engine 29, generates the "signal which indicates that the engine 29 is during operation" according to the signal, and transmits the signal to the monitor 20. However, when the "signal which indicates that the engine 29 is during operation" is no more transmitted from the engine control device 27 to the monitor 20 for some reason, the accumulated operation time can be obtained as follows.

A signal (a predetermined voltage) from the alternator 35 is transmitted to the monitor 20 through a signal line 35A. The monitor 20 counts a time during which the monitor 20 is receiving the signal from the alternator 35, and obtains an accumulated operation time. Note that the signal of the alternator 35 may be transmitted to the monitor 20 at a steady basis so that the accumulated operation time is counted, instead of using the "signal which, indicates that the engine 29 is during operation", as described above. Alternatively, a signal of the rotation speed sensor 38 may be directly transmitting to the monitor 20, so that the accumulated operation time is counted using the signal of the rotation speed sensor 38. As described above, the monitor 20 can count the accumulated operation time.

The fuel adjustment dial 27S, the sensors 30C, the rotation speed detection sensor 38, and the liquid surface detection sensors 39A and 39F are electrically connected to the engine control device 27. With such a structure, the engine control device 27 can acquire a setting value from the fuel adjustment dial 27S, and can acquire detection values from the various sensors 30C, the rotation speed detection sensor 38, and the liquid surface detection sensors 39A and 39F.

The in-vehicle signal line 28 is, for example, a CAN. As described above, the monitor 20, the pump control device 23, the engine control device 27, and the communication processing device 37T are electrically connected to the in-vehicle signal line 28. The monitor 20, the bump control device 23, the engine control device 27, and the communication processing device 37T can mutually communicate through the in-vehicle signal line 28. A terminal 28T is electrically connected to the in-vehicle signal line 28. A terminal device, and the like are connected to the terminal 28T, so that the terminal device, the monitor 20, and the like can mutually exchange information through the terminal 28T and the in-vehicle signal line 28.

As the terminal, device, a terminal device including a communication function and a storage function can be used, such as a personal computer, a mobile terminal, or a storage medium and a reading device. Further, by use of a wireless local area network (LAN) device as the terminal 28T, the operation information of the work vehicle 10 collected by the information collection device 37 may be able to be downloaded. to the terminal. device. Note that the communication device 24 may function as the wireless LAN device, so that the abnormal information, and the like can be similarly downloaded.

As described, above, the engine control device 27 is electrically connected to the monitor 20 through the in-vehicle communication line 28. Further, as described above, the liquid surface detection sensors 39A and 39F and the rotation speed sensor 38 are electrically connected to the engine control device 27. With such a structure, the monitor 20 can acquire the information of the residual amount of the fuel or of the urea water detected by the liquid surface detection sensors 39A and 39F, or can receive an operation signal which indicates that the engine 29 is during an operation, through the engine control device 27.

The engine control device 27 acquires a detection value that indicates amounts of the fuel and the urea water from the liquid surface detection sensors 39A and 39F at a predetermined cycle, and generates information that indicates the residual amounts of the fuel and the urea water. Further, the engine control device 27 transmits the information that indicates the residual amounts of the fuel and the urea water to the monitor 20 through the in-vehicle signal line 28 at a predetermined cycle.

The traveling device 33 causes the work vehicle 10 to travel by power generated by the engine 29. In the present embodiment, the traveling device 33 includes a hydraulic motor 33M and a crawler 33C. The hydraulic motor 33M is rotated by the working oil supplied from the hydraulic pump 29OP driven by the engine 29. An injection amount of the working oil of the hydraulic pump 29OP is controlled by the rump control device 23. The hydraulic motor 33M rotates the crawler 33C, so that the traveling device 33 causes the work vehicle 10 to travel. The traveling device 33 is not limited to a device that includes the crawler 33C, and the like. For example, the traveling device 33 may be a device that transfers the power of the engine 29 to the wheels through a torque converter and a variable speed gear.

The work vehicle 10 includes the storage battery 34. The storage battery 34 is a second battery, such as a lead storage battery or a nickel hydrogen storage battery. The storage battery 34 supplies electric power to a starter 29S for starting the engine 29, and supplies electric power to various electronic devices including the monitor 20, which are included in the work vehicle 10. The storage battery 34 charges electricity generated by the alternator 35. The alternator 35 generates the electricity by being driven in conjunction with the driving of the engine 29. The electricity generated by the alternator 35 is charged in the storage battery 34.

As described above, the monitor 20 can determine whether the alternator 35 is normally being operated by receiving a signal from the alternator 35. Further, as described above, the monitor 20 can obtain the accumulated. operation time of the work vehicle 10 by counting a time during which the monitor 20 is receiving the signal from the alternator 35.

The electric power supplied from the storage battery 34 is supplied to the electronic devices, such as the starter 29S, the pump control device 23, the engine control device 27, the monitor 20, and the communication processing device 37T, through the key switch 36. The key switch 36 is electrically connected to the storage battery 34, and is further electrically connected to the pump control device 23, the engine control device 27, the monitor , and the communication processing device 37T. As the key switch 36, a switch using a cylinder lock, a press button type switch, an immobilizer key using wireless communication, or the like can be used. When the key switch 36 is turned on, the electric power is supplied from the storage battery 34 to the pump control device 23, the engine control device 27, the monitor 20, and the communication processing device 37T. When the key switch. 36 is turned off, the electric power supplied from the storage battery 34 to the pump control device 23, the engine control device 27, the monitor 20, and the information collection device 37 is cut off.

As described above, the display unit 21 of the monitor 20 switches between the first image P1 illustrated in FIG. 2 and the second image P2 illustrated in FIG. 3, and displays the image on the screen 21D. In the present embodiment, the first image P1 is an image (normal image) displayed during an operation of the work vehicle 10. The normal image is a screen including at least a cooling water temperature gauge 45, the fuel gauge 41, and the urea water gauge 40. The first image P1 is displayed on the screen 21D of the monitor 20 after the key switch 36 of the work vehicle 10 is turned on, for example. After displaying the first image P1 on the screen 21D, the monitor 20 displays the first image P1 on the screen 21D unless an input to the monitor 20 or any event to the work vehicle 10 occurs.

The input to the monitor 20 is an input that indicates switching of the image displayed on the screen 21D. For example, when any abnormality has not occurred in the urea SCR device 30N, the operator can switch the first image P1 to the second image P2 by operating the input device 21D. In this case, at least the urea water gauge 40 is displayed in the second image P2, and no abnormality has occurred In the urea SCR device 30N, and thus abnormal information CI and a necessary time TL as illustrated, in FIG. 3 are not displayed. Here, to indicate that any abnormality has not occurred in the urea SCR device 30N, information such as "during normal operation" may be displayed with characters. If the operator does not operate the input device 21S, the display control unit 22 automatically switches the image to the first image P1 that is the normal image after the lapse of a predetermined time.

An example of the event, necessary for switching the display of the first image P1 displayed on the screen 21D includes a phenomenon in which some abnormality has occurred in the exhaust gas processing device 30, and processing to remove the abnormality needs to be prompted to the operator of the work vehicle 10. In such a case, the display control unit 22 automatically switches the screen 21D from the first image P1 to the second image P2. If the operator does not operate the input device 21S at all, the display control unit 22 automatically switches the second image P2 to the first image P1 that is the normal image, after the lapse of a predetermined time. The condition necessary for switching the display of the first image P1 on the screen 21D is not limited the above examples.

The first image P1 includes the fuel gauge 41 that indicates the residual amount of the fuel, a working oil temperature gauge 43 that indicates a temperature of the working oil, and the cooling water temperature gauge 45 that indicates a temperature of the cooling water of the engine 29. When the fuel remained in the fuel, tank 31 is a large amount, a needle indicated in the fuel gauge 41 points at a direction closer to F. When the fuel remained in the fuel tank 31 is a small amount, the needle indicated in the fuel gauge 41 points at a direction closer to E. When the needle indicated in the working oil temperature gauge 43 or in the cooling water temperature gauge 45 points at a direction closer to H, the working oil, or the cooling water is in a high temperature state. When the needle indicated in the working oil temperature gauge 43 or in the cooling water temperature gauge 45 points at a direction closer to C, the temperature of the working oil or the cooling water is in a low temperature state.

Further, the first image P1 includes an accumulated operation time 47 that indicates the accumulated operation time of the engine 29. The accumulated operation time 47 is obtained based on the signal transmitted from the engine control device 27 to the monitor 20, as described above. Note that the working oil temperature gauge 43 may not be included in things displayed in the first, image P1. Further, the gauges 41, 43, and 45 may indicate a state amount in another display form, such as a pie chart or a bar graph, instead of a needle-type gauge.

In the present embodiment, the urea water pane 40 is also included in the first image P1. The residual amount of the urea water indicated by the urea water gauge 40 is the device information related to a state of the exhaust gas processing device 30, as described above. In the present embodiment, the display control unit 22 of the monitor 20 illustrated in FIG. 1 displays the residual amount of the urea water indicated by the urea water gauge 40 in the first image P1 as the device information.

The accumulated operation time 47 indicates an accumulated value of a time during which the engine 29 of the work vehicle 10 has been operated so far, as the accumulated operation time of the work vehicle 10. The first image P1 displays at least the accumulated operation time, as the information of the work vehicle 10. The first image P1 is displayed during an operation of the work vehicle 10, and thus may include information necessary for the operation of the work vehicle 10 other than the accumulated operation time. Examples of such information includes classification information related to an operation mode that gives priority to fuel consumption of the working machine 10, or an operation mode that gives priority to excavation force of the working machine 10, and classification information related to mode setting of a travel speed of the working machine 10. If the work vehicle 10 has many opportunities of traveling, as a dump truck or a wheel loader does, an accumulated travel distance, the travel speed, and the like are necessary information at the operation of the work vehicle 10.

In the urea water gauge 40, a plurality of indicators 40G that indicates a position of the liquid surface of the urea water accumulated in the urea water tank 32 is displayed between a state F in which the urea water is filled in the urea water tank 32 and a state E that indicates no urea water is left in the urea water tank 32. The state F in which the urea water is filled is indicated by an icon 40F, and the state F in which no urea water is left is indicated by an icon 40E. Note that it is favorable to display the urea water gauge 40 in a position next to the fuel gauge 41. The urea water and the fuel are managed in a common viewpoint that they are consumed and require successive replenishment. Therefore, the management of the residual amounts becomes easy by displaying the urea water gauge 40 and the fuel gauge 41 in close positions.

The urea water gauge 40 includes an icon 40I indicated by a pattern that means information is related to the urea SCR device 30N. Note that the pattern of the icon 40I has the same form as a pattern of a tab TBd illustrated in FIG. 3. When the urea water is consumed and is decreased to less than a certain threshold, the display control unit 22 notifies the operator of the decrease in the urea water by making the color of the icon 40I different from usual or blinking the icon 40I. Alternatively, when disconnection of the in-vehicle signal line 28 or failure of the liquid surface detection sensor 39A itself has occurred (hereinafter, detection abnormality), the display control unit 22 can also notify the operator of she occurrence of the abnormality by making the color of the icon 40I different or blinking the icon 40I. Regarding the color of the icon 40I, the color displayed when the urea water is decreased, and the color displayed when the abnormality has been detected are made different, whereby the operator of a serviceman can clearly distinguish the phenomenon which has occurred from the other one.

The plurality of indicators 40G is lighted according to the residual amount of the urea water in the urea water tank 32, that is, the position of the liquid surface of the urea water. When the position of the liquid surface of the urea water is close to an upper portion of the urea water tank 32, the indicators 40G at the icon 40F side are lighted. FIGS. 2 and 3 indicate a state in which the indicators 40G with hatching are lighted (the same applied hereinafter). When the urea water is consumed, and the position of the liquid surface of the urea water is close to a bottom portion of the urea water tank 32, the indicators 40G at the icon 40F side are sequentially put out according to a decrease amount of the urea water. With such an operation, the urea water gauge 40 displays the residual amount of the urea water accumulated in the urea water tank 32. That is, the urea water gauge 40 displays the residual amount of the urea water by the number of lighted indicators 40G. To be specific, the residual amount of the urea water is decreased as the number of the lighted indicators 40G is decreased.

Since the first image P1 includes the urea water gauge 40, the operator of the work vehicle 10 can always confirm the residual amount of the urea water during working. Therefore, the operator can appropriately arrange for or supply the urea water according to the residual amount of the urea water.

The second image P2 illustrated in FIG. 3 individually displays a plurality of types of information. The second image P2 switches and displays the plurality of types of information with tabs TBa, TBb, TBc, TBd, TBe, and TBf. The tabs can be switched by an operation of the input device 21S. In the example illustrated in FIG. 3, the tab TBd is selected. The tab TBd includes the information related to the urea SCR device 30N. Note that the tab TBa includes information related to an environment, such as a history of a fuel consumption amount, the tab TBb includes information related to a manual of the work vehicle 10, the tab TBc includes information related to the DPF device 30P, the tab TBe includes information related to the oil pressure system, and the tab TBf includes setting of the monitor 20. The tabs may include tags including information related to operation setting of the work vehicle 10 or information related to a maintenance history of the working machine 10. The content and the number of the plurality of types of information included in the second image P2 are not limited to the above examples. It is favorable to include information related to the exhaust gas processing device 30.

The second image P2 illustrated in FIG. 3 is an example in which some abnormality has occurred in the urea SCR device 30N, and an output of the engine 29 is to be restricted if any processing is not taken against the abnormality (state information). Transition to the second image P2 can be executed even if any abnormality has not occurred. in the urea SCR device 30N. In such a case, the second image P2 may indicate the fact that the urea SOP device 30N and the like are normally being operated (state information), as described above. Even if any abnormality has not occurred in the urea SCR device 30N, the urea water gauge 40 in a similar display form to the urea water gauge 40 of the first image P1 is at least displayed in the second image P2. As illustrated in FIG. 3, the content of the abnormality may be characters as illustrated in FIG. 3, as the abnormal information CI. A pattern or a symbol that intuitively indicates the content of the abnormality may be employed. Further, the second image P2 displays a necessary time TL to restrict an output of the engine 29, as one of the state information. In this example, the output of the engine 29 is restricted by the engine control device 27 if processing to remove the abnormality is not performed against the abnormality that has occurred in the urea SCR device 30N, even after 12 h (hours) and 34 m (minutes) have elapsed.

In the present embodiment, the display control unit 22 of the monitor 20 illustrated in FIG. 1 also displays the residual amount of the urea water in the second image P2 as the device information. In this case, the display control unit 22 displays the residual amount of the urea water in the second image P2 in a similar display form to the first image P1. To be specific, the display control unit 22 displays the urea water gauge 40 in the second image P2, which has the same content as and in a similar display form to the urea water gauge 40 in the first image P1. That is, the urea water gauge 40 displayed in the second image P2 includes, similarly to the urea water gauge 40 displayed in the first image P1, the icon 40I, the icon 40E, the icon 40F, and a plurality of indicators 40G provided between the icon 40E and the icon 40F.

While the urea water gauge 40 is longitudinally arranged in the first image P1, the urea water gauge 40 is laterally arranged in the second image P2. That is, the icon 40E, the icon 40F, and the indicators 40G of the urea water gauge 40 are displayed in the second image P2 in a similar display form (design) to the display form (design) displayed in the first image P1. Note that, in the second image P2, the urea water gauge 40 may also be longitudinally displayed in a similar display form to the first image P1. In the present embodiment, while the longitudinal and lateral directions of the urea water gauge 40 are different between the first image P1 and the second image, the forms, configurations, and displayed information of the urea water gauge 40 are the same. Further, if the forms, configurations and displayed information of the urea water gauge 40 displayed in the first image P1 and of the urea water gauge 40 displayed in the second image 52 are the same while only the entire sizes are different, both are displayed in similar display forms. The form, configuration, and displayed information of the urea water gauge 40 are at least one of the design and the color indicated by the pattern of the icon 40I, at least one of the design and the color indicated by the icons 40E and 40F, at least one of the design and the color indicated by the indicator 40G, and the number of segments of the indicator 40G. As described above, the display control unit 22 displays the device information (in this example, the residual amount of the urea water) in the first image P1 and the second image P2 similar display forms, whereby the operator of the work vehicle 10 can easily recognize the residual amount of the urea water.

The operator is used to seeing the display form of the urea water gauge 40 in the first image P1 that is the image (normal image) displayed at an operation of the working machine 10. Therefore, the urea water gauge 40 expressed in a familiar display form is displayed in the second image P2, which the operator does not frequent see, in a similar display form, whereby the operator can intuitively recognize that the residual amount of the urea water is displayed in the second image P2 without confusion. That is, even if the image displayed on the screen 21D of the monitor 20 is made transition between the first image P1 and the second image P2, the operator can reliably recognize the residual amount or the urea water. As a result, the operator can arrange for or supply the urea water at an appropriate timing. Further, progress management of work, such as adjustment of an operation time of the working machine 10, can be performed according to the residual amount of the urea water.

The second image P2 indicates that the abnormality of the urea SCR device 30N has occurred, and thus the operator of the work vehicle 10 can recognize the fact that the abnormality has occurred in the urea SCR device 30N and the content of the abnormality that has occurred from the information displayed in the second image P2. In the second image P2, the residual amount of the urea water indicated by the urea water gauge 40 is also displayed together with the abnormality of the urea SCR device 30N. Therefore, the operator can intuitively recognize the relationship between the abnormality and the residual amount of the urea water. That is, the operator can quickly and accurately recognize the content of the abnormality by comparing the abnormality of the urea SCR device 30N and the residual amount of the urea water. Note that, in the present embodiment, even if the abnormality of the urea SCR device 30N has not occurred, the urea. water gauge 40 is displayed in the second image P2. Therefore, the operator can recognize that the urea SCR device 30N is normally being operated and the residual amount of the urea water at the same time, even when the urea SCR device 30N is normally being operated.

For example, in the example illustrated in FIG. 3, five out of eight indicators 40G included in the urea water gauge 40 are lighted. Therefore, the operator can intuitively understand half or more of the urea water remains in the urea water tank 32 by visually recognizing the urea water gauge 40 displayed in the second image P2. Therefore, the operator can determine that the abnormality having occurred in the urea SCR device 30N is not due to insufficiency of the residual amount of the urea water, just by looking at the urea water gauge. On that basis, the operator can easily identify the cause of the abnormality that has occurred in the urea SCR device 30N by reading the abnormal information CI indicated in the second image P2 by characters.

For example, when all of the eight indicators 40G included in the urea water gauge 40 are not lighted, the operator can determine, that there is a possibility that the abnormality due to insufficiency of the residual amount of the urea water has occurred in the urea SCR device 30N by visually recognizing the urea water gauge 40. On that basis, the operator can easily identify the cause of the abnormality that has occurred in the urea SCR device 30N by reading the information indicated in the second image P2 by characters.

For example, when the residual amount of the urea water is sufficient according to the urea water gauge 40, but occurrence of the abnormality due to insufficiency of the residual amount of the urea water is displayed in the abnormal information CI of the second image P2, the operator can determine causes of the abnormality indicated by the two are different. In this case, it can be estimated that abnormality has occurred in the in-vehicle signal line 28 or the liquid surface detection sensor 39A Illustrated in FIG. 1. Alternatively, when the residual amount of the urea water is insufficient according to the urea water gauge 40, but occurrence of abnormality due to a cause other than the insufficiency of the residual amount of the urea water is displayed in the abnormal information CI of the second image P2, or when the residual amount of the urea water is insufficient according to the urea water gauge 40, but occurrence of abnormality due to a cause other than the insufficiency of the residual amount of the urea water is displayed in the second image P2, there is a possibility that abnormality that should be removed before the insufficiency of the residual amount of the urea water may have occurred. In this way, the display control unit 22 displays the residual amount of the urea water and the abnormality that has occurred in the urea SCR device 30N in the same image (the second image in the present embodiment), whereby the determination of the abnormality can be easily made, the accuracy of identification of the abnormality can be improved, and a prompt action can be taken.

In the present embodiment, when abnormality in detection (detection abnormality) of the residual amount of the urea water by the liquid surface detection sensor 39A has occurred due to disconnection of the in-vehicle signal line 28, failure of the liquid surface detection sensor 39A itself, or the like, the display control unit 22 illustrated in FIG. 1 may display the device information of the second image P2, that is, the urea water gauge 40, in a display form different from normal one. By doing so, a possibility that the residual mount of the urea water displayed in the urea water gauge 40 is not a right, value can be notified to the operator of the work vehicle 10.

For example, to make display forms of the urea water gauge 40 different between a case in which the detect oh abnormality has not occurred and a case in which the detection abnormality has occurred, the display control unit 22 can make the color of the entire urea water gauge 40 in the case of abnormality different from the case in which. the abnormality has not occurred, or can make the urea water gauge 40 blinking, for example. Further, as described above, the display control unit 22 may make the display forms of the icon 40I illustrated in FIG. different between a normal time and an abnormal time. For example, the display control unit 22 can change the color of the icon 40I or blink the icon 40I.

By doing so, the display control unit 22 can clearly present the occurrence of the detection abnormality to the operator. Further, when the urea water is consumed, and is decreased to less than a certain threshold, the display control unit 22 makes the color of the icon 40I different from the normal time, or blinks the icon 40I. At this time, regarding the color of the icon 40I, the color displayed when the urea water is decreased, and the color displayed at a detection abnormal time are made different, whereby the phenomenon which has occurred can be clearly distinguished from the other one. As described above, making the display form of the urea water gauge 40 different in the three states of the normal time, the detection abnormal time, and the time of the decrease in the urea water may be performed not only in a state where the second image P1 is displayed, but also in a state where the first image P1 is displayed, in a similar manner.

When the display control unit 22 of the monitor 20 has acquired, through the in-vehicle signal line 28, a signal which indicates that a ultrasonic sensor used as the liquid surface detection sensor 39A has performed inappropriate detection, that is, at the detection abnormal time, the display control unit 22 displays the urea water gauge 40 in a display form different from the normal time, as described above. Further, when some abnormality occurs in the in-vehicle signal line 28 illustrated in FIG. 1 and the display control unit 22 and the engine control device 27 cannot. acquire the detection value of the liquid surface detection. sensor 39A, the abnormality has also occurred in the detection of the residual amount of the urea water by the liquid surface detection sensor 39A, which corresponds to the detection abnormality. The abnormality that has occurred in the in-vehicle signal line 23 is detected by a communication control unit (not illustrated) included in the monitor 20, for example. When the communication control unit has detected. the detection abnormality, the display control unit 22 displays the urea water gauge 40 in a display form different. from the normal time. As described above, when the abnormality has occurred in the detection of the residual amount of the urea water by the liquid surface detection sensor 39A, the display control unit 22 makes the display form of the urea water gauge 40 different. Therefore, the operator can recognize the possibility that the residual amount of the urea water indicated in the urea water gauge 40 is not accurate, As described above, the display form of the urea water gauge 40 is made different from the normal time at the occurrence of the detection abnormality or at the decrease in the urea water, whereby the operator can easily distinguish the cause of the abnormality.

In the present embodiment, while the urea water gauge 40 includes the plurality of indicators 40G, the form that indicates the residual amount of the urea water is not limited to the form of the urea water gauge 40. For example, the residual amount of the urea water may be indicated by a numerical value, or may be indicated by a height of the liquid surface of the urea water in the urea water tank 32 with a ratio or the like.

In the present embodiment, the device information related to the state of the exhaust gas processing device is the residual amount of the urea water. However, the device information is not limited thereto. For example, at least one of the temperature of the urea water and the quality of the urea water may be the device information. Other than the above, regarding the urea SCR device 30N, information related to a state of a supply system that supplies the urea water to the exhaust gas may be the device information. The information related to a state of a supply system is, for example, information related to an injection device that injects urea toward the exhaust gas, information related to piping that supplies the urea water, information related to a device that supplies the urea water to the injection device, and the like. Further, information about a sensor that detects ammonia in the urea SCR device 30N may be the device, information.

Information related to a state of the DPF device 30P illustrated in FIG. 1 may be the device information. To be specific, a pressure difference between an inlet and an outlet of a filter included in the DPI device 30P, an inlet temperature and an output temperature of a diesel oxygen catalyst (DOC) included in the DPI device 30P, and the like may be the device information. Further, information related to a sensor that measures a sucked air amount of the engine 29, a sensor that detects an amount of a nitrogen oxide contained in the exhaust gas, and the like may be the device information. When the device information displayed in the second image P2 is the information related to the state of the DPI device 30P, it is favorable that the device information is displayed in the first image P1 in a similar display form, and the device, information is displayed together with the information displayed when the tab TBc of the second image P2 illustrated in FIG. 3 is selected.

In the present embodiment, the display control unit 22 of the monitor 20 displays either the first image P1 or the second image P2 different from the first image P1, and displays the device information related to the state of the exhaust gas processing device 30 in the first image P1 and the second image P2. As described above, information having the same content related to the exhaust gas processing device 30 is displayed on different screens, whereby the operator of the work vehicle becomes to pay more attention to the information of the same content displayed on the screen 21D. As a result, the present embodiment can easily invite the operator of the work vehicle 10 to pay attention to the state of the exhaust as processing device 30, in the work vehicle 10 including the engine 29 and the exhaust gas processing device 30 that processes the exhaust gas discharged from the engine 29.

For example, the display control unit 22 displays the information related to the residual amount of the urea water in the first image P1 and the second image P2, whereby the operator becomes to pay more attention to the residual amount of the urea water. Therefore, the operator can arrange for and supply the urea water at an appropriate timing. Even if the screen 21D of the monitor 20 is switched from the first image P1 to the second image P1, the device information is displayed in the second image P1 in a similar display state to the device information included in the first image P1. Therefore, the operator can intuitively recognize the content of the information indicated by the device information and acquire the information. As described above, according to the present embodiment, the possibility that the processing of the abnormality that has occurred in the exhaust gas processing device 30 is delayed or the opportunity of maintenance and inspection is missed can be decreased.

Further, as the device information relates to the state of the OFF device 30P, if the display control unit 22 displays information related. to clogging of a filter included in the DPF device 30P in the first image P1 and the second image P2, the operator becomes to pay more attention to the clogging of the filter. In this case, the device information is displayed on the screen 21D on which the tab TBc of the second image P2 is selected. As a result, the filter can be regenerated or exchanged at an appropriate timing. Even in this case, the operator can always intuitively recognize and acquire the information indicated by the device information.

Note that when the urea water gauge 40 displayed in the first image P1 is switched to the second image P2, the urea water gauge 40 may be displayed in a similar display form to the first image P1 on the screen 21D even if any one of the tabs TBa, TBb, TBc, TBd, TBe, and TBf is selected.

In the above description of the present embodiment, the present embodiment is not limited by the above-described content. Further, the components described above include those that can be easily arrived, at by a Person skilled in the art, those substantially the same, and so-called equivalents. Further, the components can be appropriately combined. Still further, at least one of various omissions, replacements, modifications can be made without departing from the gist of the present embodiment.

REFERENCE SIGNS LIST

10 Work vehicle
20 Monitor
20 Control device
21D Screen
21S Input device
21 Display unit
22 Display control unit
22C Processing unit
22M Storage unit
23 Pump control device
27 Engine control device
28 In-vehicle signal line
29 Engine
29OP Hydraulic pump
29S Fuel adjustment dial
30 Exhaust gas processing device
30C Sensor
30N Urea water SCR device
30P DPF device
32 Urea water tank
35 Alternator
35S Voltage sensor
36 Key switch
37T Communication processing device
38 Rotation speed detection sensor
39A, 39F Liquid surface detection sensor
40 Urea water gauge
40G Indicator
41 Fuel gauge
P1 First image
P1 Second image

The invention claimed is:

1. A work vehicle display device included in a work vehicle including an internal-combustion engine that generates power and an exhaust gas processing device that processes exhaust gas discharged from the internal-combustion engine using urea water, the work vehicle display device comprising:
a display unit configured to display an image; and
a display control unit configured to display either a first image or a second image different from the first image in the display unit, the first image being an image including a display of at least a residual amount of fuel and a cooling water temperature, the second image being an image including abnormal information of the exhaust gas processing device that processes the exhaust gas using the urea water,
wherein the display control unit displays a residual amount of the urea water in the first image and the second image.

2. The work vehicle display device according to claim 1, wherein the display control unit displays the device information in the first image and the second image in similar display forms.

3. The work vehicle display device according to claim 1, wherein the device information is a residual amount of urea water accumulated in a tank included in the work vehicle and is supplied to the exhaust gas processing device.

4. The work vehicle display device according to claim 3, wherein the display control unit displays the device information differently from a normal case when abnormality has occurred in detection of the residual amount of the urea water.

5. The work vehicle display device according to claim 1, wherein the display control unit displays the first image during work of the work vehicle, and enables the second image to be displayed while the work vehicle is not working.

6. The work vehicle display device according to claim 1, wherein the first image is a normal image displayed during an operation of the work vehicle, and the second image is an image switched from the normal image to be displayed in response to an input from an input device or an event that has occurred in the work vehicle.

7. A work vehicle comprising:
an internal-combustion engine configured to generate power;
an exhaust gas processing device configured to process exhaust gas discharged from the internal-combustion engine using urea water; and
a work vehicle display device comprising:
a display unit configured to display an image; and
a display control unit configured to display either a first image or a second image different from the first image in the display unit, the first image being an image including a display of at least a residual amount of fuel and a cooling water temperature, the second image being an image including abnormal information of the exhaust gas processing device that processes the exhaust gas using the urea water,
wherein the display control unit displays a residual amount of the urea water in the first image and the second image.

8. The work vehicle display device according to claim 1, wherein the second image switches between various kinds of information, and the various kinds of information includes information related to the exhaust gas processing device that processes the exhaust gas using the urea water and information related to a diesel particulate filter (DPF) device.

9. The work vehicle display device according to claim 1, wherein the second image includes information related to an output restriction of the work vehicle.

10. The work vehicle display device according to claim 1, wherein the second image includes an image displayed in a state where the exhaust gas processing device that processes the exhaust gas using the urea water is normally being operated.

11. A work vehicle display device included in a work vehicle including an internal-combustion engine that generates power and an exhaust gas processing device that processes exhaust gas discharged from the internal-combustion engine using urea water, the work vehicle display device comprising:

a display unit configured to display an image; and a display control unit configured to display either a first image or a second image different from the first image in the display unit, wherein the display control unit displays device information having a same content related to a state of the exhaust gas processing device in the first image and the second image, wherein the device information in the first and second images includes an indication of a residual amount of urea water for the exhaust gas processing device and an indication of an abnormality or normality in a detection of the residual amount of urea water.

12. The work vehicle display device according to claim 11, wherein the device information in the first and second images includes a urea water gauge, the urea water gauge having:

a plurality of lightable indicators to indicate a residual amount of urea water for the exhaust gas processing device, the plurality of lightable indicators being arranged laterally or longitudinally along a line in the first and second images, and an icon which is displayed in a first way in a normal case to indicate that the detection of the residual amount of the urea water is normal and displayed in a different second way from the normal case to indicate that the detection of the residual amount of the urea water is abnormal.

13. The work vehicle display device according to claim 12, wherein the different second way includes making a color of the icon different from a normal case, or blinking the icon.

14. The work vehicle display device according to claim 12, wherein the icon is displayable in a different third way when an amount of residual urea water is less than a certain threshold.

15. The work vehicle display device according to claim 11, wherein the device information in the first and second images includes a urea water gauge which indicates the residual amount of urea water for the exhaust gas processing device, the display control unit displaying the urea water gauge in a first color to indicate abnormality in a detection of the residual amount of urea water and in a different second color to indicate normality in a detection of the residual amount of urea water.

16. The work vehicle display device according to claim 11, wherein the abnormality in detection of the residual amount of the urea water is due to a disconnection of an in-vehicle signal line or a failure of a sensor for detecting an amount of the urea water.

* * * * *